May 24, 1932.                L. D. BRAUKS                1,860,011
                      INTERNAL EXPANDING BRAKE
                        Filed May 28, 1930
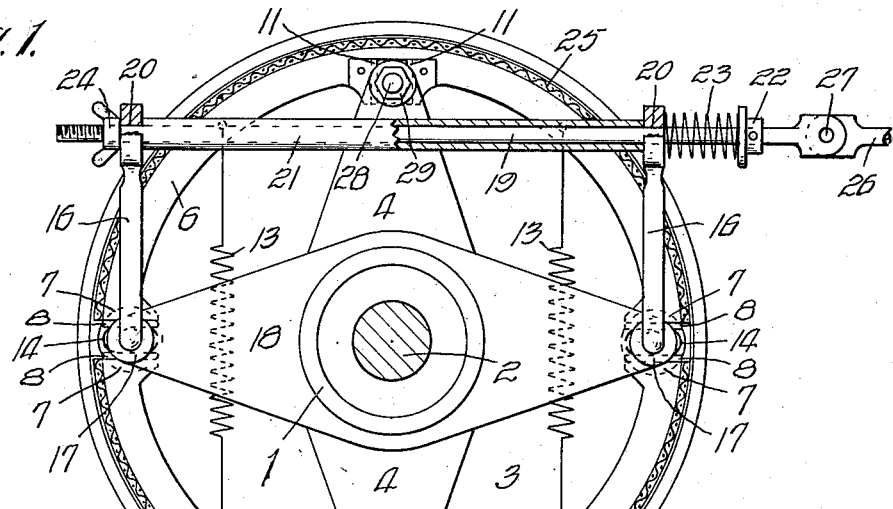
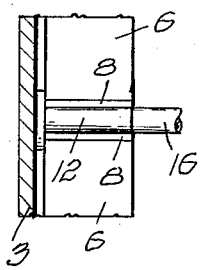
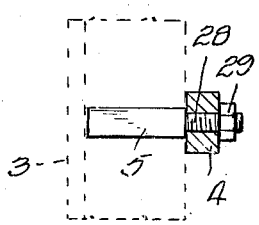
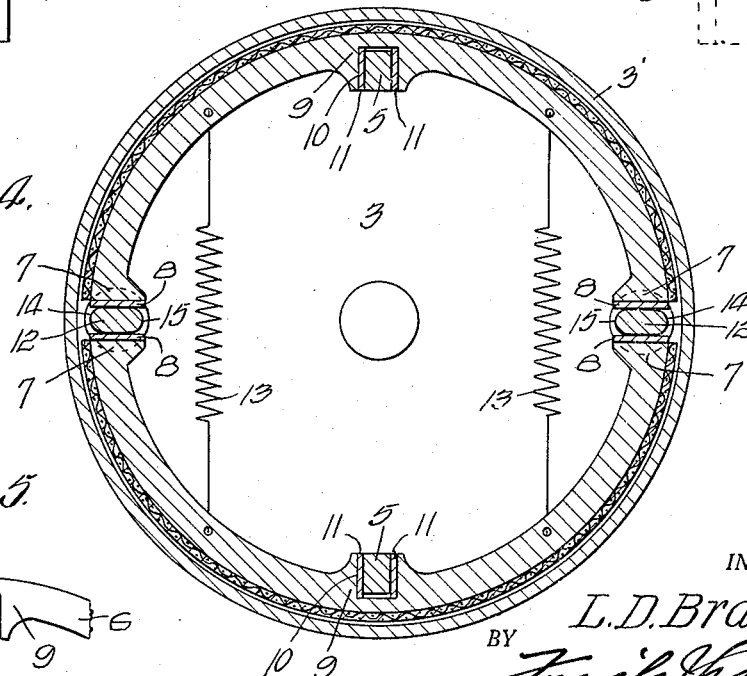
INVENTOR:
L. D. Brauks.
BY
ATTORNEY.

Patented May 24, 1932

1,860,011

UNITED STATES PATENT OFFICE

LESLIE D. BRAUKS, OF ST. LOUIS, MISSOURI

INTERNAL EXPANDING BRAKE

Application filed May 28, 1930. Serial No. 456,689.

My invention relates to internal expanding brakes, and more particularly to brakes of the internal expanding type wherein two brake shoes are moved toward and away from each other by means of opposed rotatable expanding cams interposed between the ends of the brake shoes.

A further object of the invention resides in slidably mounting the brake shoes and laterally directed anchor studs carried by means supported by the axle housing.

A still further object of the invention resides in connecting the lever arms of the expanding cams to a brake rod, whereby the lever arms are definitely and accurately spaced and whereby proper brake adjustment can be made as the brake lining becomes worn.

A further object of the invention resides in providing the brake shoes with detachable wearing plates adapted for contact by both the anchor studs and the expanding cams.

A still further object of the invention resides in the provision of an internal expanding brake which possesses advantages in points of simplicity and efficiency, and, at the same time proves itself comparatively inexpensive in the cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1 is an inner side elevation of a brake mechanism embodying the features of my invention.

Fig. 2 is a detail in side elevation showing one of the expanding cams disposed between the thrust ends of a pair of opposed brake shoes.

Fig. 3 is a detail in plan view of one of the anchor studs secured to its supporting means.

Fig. 4 is a vertical sectional view of the brake embodying the features of my invention.

Fig. 5 is a detail in side elevation of the midway head portion of one of the brake shoes.

Referring to the drawings, the reference character 1 designates an axle housing and 2 an axle for a wheel, not shown. 3 designates the back wall of the usual brake drum having the braking flange 3' which drum is carried by a wheel for rotation therewith, as well understood in the art, thus it is believed unnecessary to illustrate the wheel.

Directed laterally from a suitable support 4 carried by the axle housing 1 are a pair of suitable anchor studs 5 arranged in opposed relation on opposite sides of the axis of the axle housing and adapted to be directed into the brake drum.

Two approximately semi-circular brake shoes designated 6, preferably cast from suitable metal, are mounted internally of the brake drum in opposed relation, or at opposite sides of the axis of the brake drum and adjacent ends thereof and are spaced a suitable distance apart. Each end of each brake shoe 6 is provided with a thrust head 7 and the end face of each thrust head is provided with a suitable detachable wear plate 8.

The brake shoes 6 are each provided midway their ends with a suitable head 9 provided with a transverse slotted recess 10 which is open at its ends. The side walls of the recesses 10 are each provided with suitable detachable wear plates 11 adapted to engage the side faces of each anchor stud 5 when the brake shoes have been mounted upon their respective anchor studs. The brake shoes 6, it will be observed, are readily applied to and removed from the anchor studs 5 after the wheel carrying the brake drum has been removed from the axle.

The brake shoes 6 are mounted upon the anchor studs 5 so as to be free for sliding movement upon their respective anchor studs away from and toward each other during their braking and releasing movements, respectively. The studs 5, it will be observed, centralize the position of the brake shoes and prevent rocking displacement of the brake shoes during braking movements of the shoes.

A pair of expanding cams 12 for the brake shoes are interposed between the thrust heads 7 of each pair of shoes and their broad sides are adapted to normally engage the wear plates detachably carried by the thrust heads of the brake shoes. Suitable resilient means, such for instance, as coiled springs 13, or their equivalent, are connected at their ends to the two brake shoes 6 to release the brake shoes from braking contact with the brake drum.

The side faces of the expanding cams are curved outwardly as at 14 and 15, so as to provide elliptically shaped cams that can be rocked toward or away from each other for expanding or moving the brake shoes away from each other when it is desired to set the brake.

Each expanding cam 12 is connected to a suitable lever arm 16 journaled in a suitable bearing 17 carried by a suitable support 18 carried by the axle housing 1. A suitable brake rod member 19 passes through openings 20 in the upper ends of the lever arms 16 and the rod 19 is provided with a spacer sleeve 21 which is mounted thereon between the lever arms 16 with the ends of the spacer sleeve in contact with the inner faces of the lever arms, thus definitely and accurately spacing the lever arms apart so that they will remain parallel to each other. The brake rod section 19 is provided with a stop collar 22 at one end thereof and a suitable resilient member 23 is mounted upon the rod and interposed between the stop collar 22 and one of the lever arms 16 so as to exert end pressure against the lever arm to hold the two lever arms in contact with the ends of the spacer sleeve. The end of the brake rod opposite the stop collar is screw threaded and provided with a suitable adjusting nut 24 adapted for contact with the opposite lever arm 16. Thus, as the brake lining 25 carried by the brake shoes wears, or, if no lining is employed and the brake shoes wear, the cams can be adjusted by taking up on the nut 24 so as to properly contact with the thrust heads of the brake shoes. The brake rod section 19 can be actuated by means of a foot actuated brake rod 26 to which it is connected, as at 27, or it may be operated by other brake connections or mechanism.

The anchor studs 5 are preferably detachably connected to their support, as by means of a screw threaded shank 28 and a locking nut 29, as shown in Fig. 3.

The brake shoes are made alike, as well as the expanding cams and the anchor studs, thus they are interchangeable and reduce the number of varied parts employed in the brake structure.

From the foregoing description, it is evident that I provide a wheel brake, wherein the brake shoes are moved, or expanded bodily away from each other by equal cam pressure exerted against opposite thrust ends of the brake shoes so that the braking surface of the shoes is distributed more or less equally throughout its entire area against the brake drum, thus preventing squeaks and affording a larger braking surface effect than is now afforded with the present types of brake shoes. Also, in that the brake shoes are slidably carried in and out by a fixed support carried by the axle housing, it is evident that there will be no rocking or displacement of the brake shoes within the brake drum, or tendency of the shoes to move with the brake drum, as they are mounted for in and out sliding movement only upon the studs which act as anchor means for supporting the two brake shoes in their truly opposed positions within the brake drum at all times.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention may be made without conflicting or departing from the spirit of the invention within the scope of the appended claims.

What I claim is:

1. In an internal expanding brake structure, a brake drum, a pair of brake shoes internally of the brake drum at opposite sides of the axis of the brake drum, supporting means, anchor studs carried by the supporting means and directed laterally into the brake drum upon which the brake shoes are slidably mounted, expanding cams interposed between the ends of the brake shoes for moving the brake shoes away from each other upon the anchor studs and into braking contact with the brake drum, resilient means connecting the brake shoes for moving them toward each other upon the anchor studs when the brake is released, detachable wear plates for the thrust ends of the brake shoes and detachable wear plates carried by the brake shoes for contact with the anchor studs.

2. In an internal expanding brake structure, a brake drum, a pair of brake shoes internally of the brake drum at opposite sides of the axis of the brake drum, supporting means, anchor studs carried by the supporting means and directed laterally into the brake drum upon which the brake shoes are slidably mounted, expanding cams interposed between the ends of the brake shoes for moving the brake shoes away from each other upon the anchor studs and into braking contact with the brake drum, resilient means connecting the brake shoes for moving them toward each other upon the anchor studs when the brake is released, detachable wear plates for the thrust ends of the brake shoes, detachable wear plates carried by the brake shoes for contact with the anchor studs, means operable to effect rocking movement of the expanding cams embodying a brake rod carried by lever arms directed from the expanding cams, a spacer sleeve mounted on the brake rod and interposed between the lever arms, resilient means adjacent to and in contact with one of the lever arms for exerting pressure against said lever arms and adjusting means carried by the brake rod and adapted for contact with the opposite lever arm.

In testimony whereof, I have hereunto affixed my signature.

LESLIE D. BRAUKS.